United States Patent [19]
Suzuki

[11] Patent Number: 5,088,171
[45] Date of Patent: Feb. 18, 1992

[54] ASSEMBLY ROBOT WITH DRILLING UNIT

[75] Inventor: Takashi Suzuki, Utsunomiya, Japan

[73] Assignee: Fuji Jukogyo Kabushiki Kaisha, Tokyo, Japan

[21] Appl. No.: 731,135

[22] Filed: Jul. 15, 1991

[30] Foreign Application Priority Data

Jul. 23, 1990 [JP] Japan .......................... 1-194200[U]

[51] Int. Cl.⁵ .................... B23Q 37/00; B23B 39/14
[52] U.S. Cl. ................................. 29/26 A; 29/34 B; 33/644; 408/127; 408/237; 409/216; 901/41
[58] Field of Search .................. 29/26 R, 26 A, 34 B, 29/56.5; 409/216, 201, 211; 408/127, 81, 11, 236, 237, 238, 97; 227/51, 58; 901/30, 41, 45; 414/730; 33/558, 644, 560, 628, 645

[56] References Cited

U.S. PATENT DOCUMENTS

| | | | |
|---|---|---|---|
| 4,155,169 | 5/1979 | Drake et al. .......................... 33/644 |
| 4,202,107 | 5/1980 | Watson .............................. 901/45 X |
| 4,332,066 | 6/1982 | Hailey et al. ....................... 29/26 R |
| 4,885,836 | 12/1989 | Bonomi et al. .................. 29/34 B X |
| 4,995,148 | 2/1991 | Bonomi et al. .................... 901/41 X |

Primary Examiner—William Briggs
Attorney, Agent, or Firm—Beveridge, DeGrandi & Weilacher

[57] ABSTRACT

A drilling unit mounted on an arm of an assembly robot. In order to enable a drill bush of a nose piece, for guiding a drill, to be adjustably moved into exactly registering relation with a bore of a template laid on a workpiece, the nose piece is mounted on a first cylindrical member which is mounted on a second cylindrical member through a first compliance mechanism comprising elastic support members which constitute oblique links of a trapezoidal link mechanism having an imaginary intersection of the oblique links at a front end of the drill bush. The drill bush can therefore make a swinging motion about the intersection. The second cylindrical member is mounted on a guide plate through a second compliance mechanism which enables the second cylindrical member and hence the drill bush to adjustably move in a radial direction of a rotational shaft of the drilling unit.

12 Claims, 8 Drawing Sheets

ASSEMBLY ROBOT WITH DRILLING UNIT

BACKGROUND OF THE INVENTION

The present invention relates to an assembly robot and, more particularly, to a drilling unit of the assembly robot, mounted on a front end portion of an arm of the assembly robot to be operated as a robot hand during the assembling process, for example, of an aircraft.

Recently, in an assembly line of aircraft, a composite material such as resin impregnated carbon fibers has been used, together with aluminum material, for structural members and outer plates of the aircraft.

In the aircraft assembling process, these structural members are fastened or jointed with each other with a number of fasteners such as round-head rivets or countersunk-head rivets, and high machining precision is required for drilling and countersinking a workpiece. Accordingly, in order to perform such machining, there has been used a special air drill motor such as a so-called "positive feed drill motor" or "spacematic drill motor", provided with an automatic spindle feeding mechanism, or there has been used an assembly robot provided with a drilling unit in which machining processes are preliminarily programmed.

The drilling unit mounted on the assembly robot described above is disclosed in U.S. Pat. No. 4,332,066 to Hailey et al.

The U.S. patent discloses a drilling unit of an assembly robot having a multidegree of freedom and incorporating a remote compliance mechanism. The drilling unit is capable of correcting or compensating for positional errors on the drill side during the drilling operation to secure a predetermined drilling precision. For this purpose, the remote compliance mechanism comprises outer and inner concentric annular guide members disposed in the sam plane. The inner guide member has a peripheral surface formed in the shape of a barrel and is coupled through a resilient material to the outer guide member so as to be swingable. The entire periphery of the outer guide member is supported by a plurality of elastic pins arranged with predetermined angular distances.

However, the remote compliance mechanism of the drilling unit described above is of a single unit type, so that the compliance mechanism has a small capability of compensating for or correcting positional errors and, in a worst case, accumulated errors cause a trouble that a front end of a nose piece of the drilling unit is not inserted into a bush of a drill guide plate or template.

It may be possible for the drilling unit described above to have the front end thereof inserted into the bush of the template by means of the compliance mechanism even if the front end is slightly displaced from the bush. However, since the compliance mechanism is not provided with an unlock mechanism for removing the positioning error, an excessive bending stress may be applied to the drilling unit and the robot body, resulting in damage of the drilling unit, the template or the robot body and in poor drilling and countersinking operation.

Moreover, in the drilling unit of the conventional type described above, the front end of the drilling unit is not fixedly held with respect to the template during the drilling or countersinking operation, so that the drilling arm may be shifted away from the workpiece due to a reaction force acting upon the front end of the drill during the drilling or countersinking operation. Therefore, in the case of countersinking operation, countersinking depth cannot be obtained with high precision. In addition, when the drilling unit is operated with a horizontally directed attitude, a portion of the drilling unit in front of the compliance mechanism is flexed or distorted by the self weight, resulting in the nose piece being not inserted into the template.

SUMMARY OF THE INVENTION

An object of the present invention is to eliminate the defects or drawbacks encountered in the prior art described above and to provide a drilling unit of an assembly robot capable of effectively compensating for or correcting positional errors caused during the movement of an arm member of the assembly robot or during the movement of the assembly robot, thereby improving the drilling and countersinking accuracy and performance.

This and other objects can be achieved according to the present invention by providing a drilling unit of an assembly robot comprising a robot body and a robot arm swingably extending from the robot body, said drilling unit being mounted on one end of said robot arm and having a rotational shaft driven by a motor, a drill chuck mounted on one end of the rotational shaft, a drill secured by the chuck to be inserted into a bore of a template applied to a workpiece, first actuator means for moving the drilling unit toward and away from the workpiece, and second actuator means for moving said rotational shaft toward and away from the workpiece: said drilling unit comprising: a nose piece enclosing said drill chuck and having at a forward end thereof a drill bush through which said drilling tool is advanced and retracted, a first cylindrical member carrying said nose piece on a forward end thereof, a second cylindrical member supporting said first cylindrical member on a forward end thereof and having a radial flange on a rear end thereof, an annular guide plate supporting said radial flange in face-to-face sliding contact, said first and second cylindrical members and said guide plate being disposed around said rotational shaft in a substantially coaxial arrangement, first remote compliance means comprising a plurality of elastic support members connecting said first and second cylindrical members to mount the first cylindrical member on the second cylindrical member, said elastic members constituting oblique links of a trapezoidal link mechanism having an imaginary intersection of the oblique links at a front end of said drill bush, first lock means for preventing displacement of the first cylindrical member relative to the second cylindrical member, second remote compliance means comprising said guide plate, said radial flange and stopper means for limiting sliding displacement of the radial flange relative to the guide plate, second lock means for preventing displacement of the second cylindrical member relative to the guide plate, and means for securing said drill bush to said template.

A preferred embodiment of the present invention will become understood from the following detailed description referring to the accompanying drawings.

DESCRIPTION OF THE PREFERRED EMBODIMENT

An embodiment of an assembly robot according to the present invention will be described hereunder with reference to the drawings.

Figure 1:
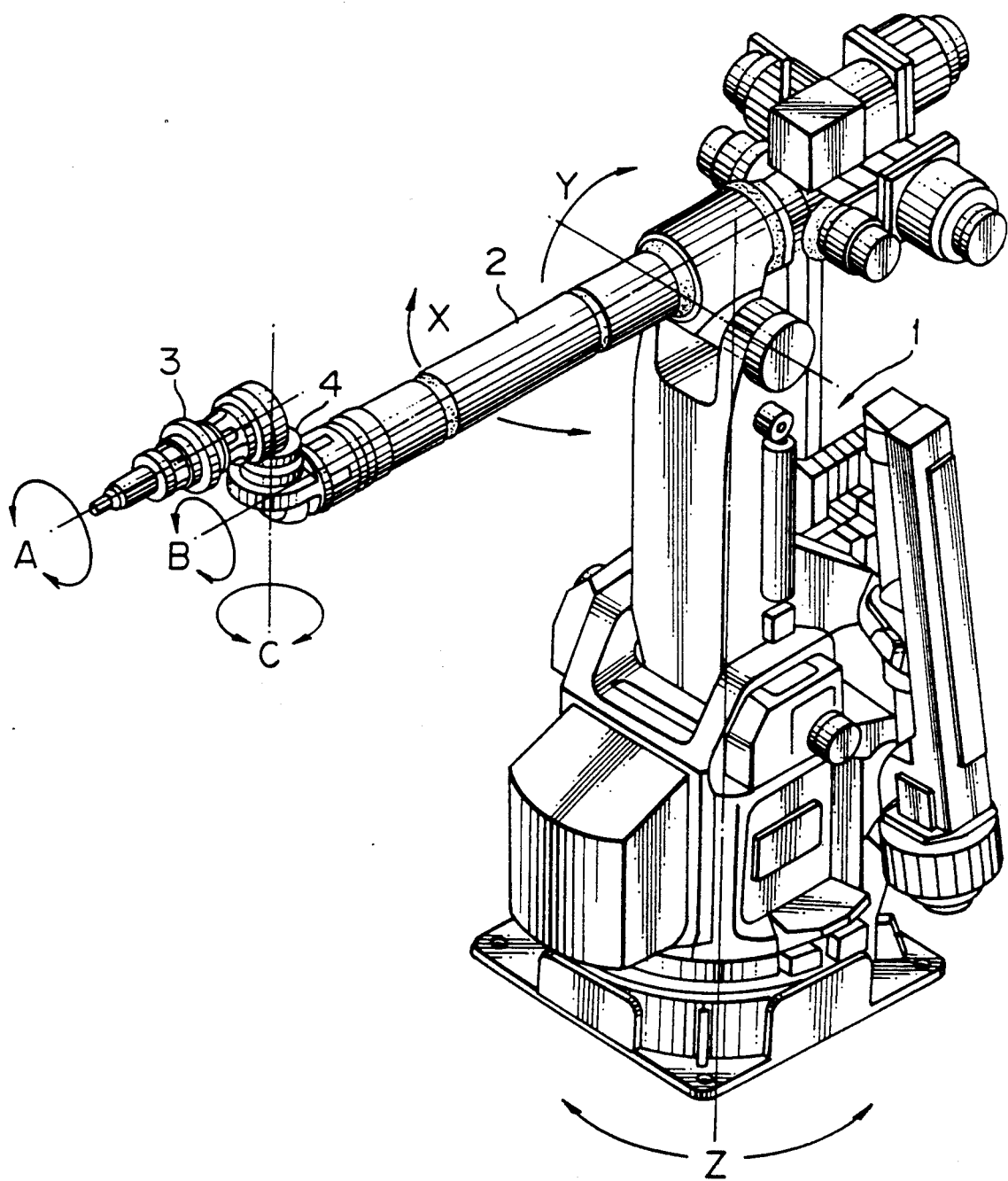
FIG. 1 is a perspective view of an assembly robot provided with a drilling unit according to the present invention.

In FIG. 1, an assembly robot 1 is shown as a six-axes robot of multidegree of freedom. The assembly robot 1 has an arm 2 extending to terminate at a front free end. A drilling unit 3 according to the present invention is mounted on the front end of the arm 2 through an adaptor 4. Electric signals are transmitted from the assembly robot 1 to the drilling unit 3 and vise versa, and accordingly, a drilling or countersinking operation on a workpiece, not shown, is carried out by manual control or automatic control based on a program prepared by an offline storage.

During the control, the assembly robot 1 can be rotated in X-, Y- and Z-directions as shown in FIG. 1. Furthermore, the assembly robot 1 can be rotated in both B- and C-directions about a mounting portion of the adaptor 4. A drilling tool 12 of the drilling unit 3 is of course rotated about the central axis thereof in an A-direction as shown. Thus, the assembly robot 1 is a six-axes robot of multidegree of freedom.

Figure 2:
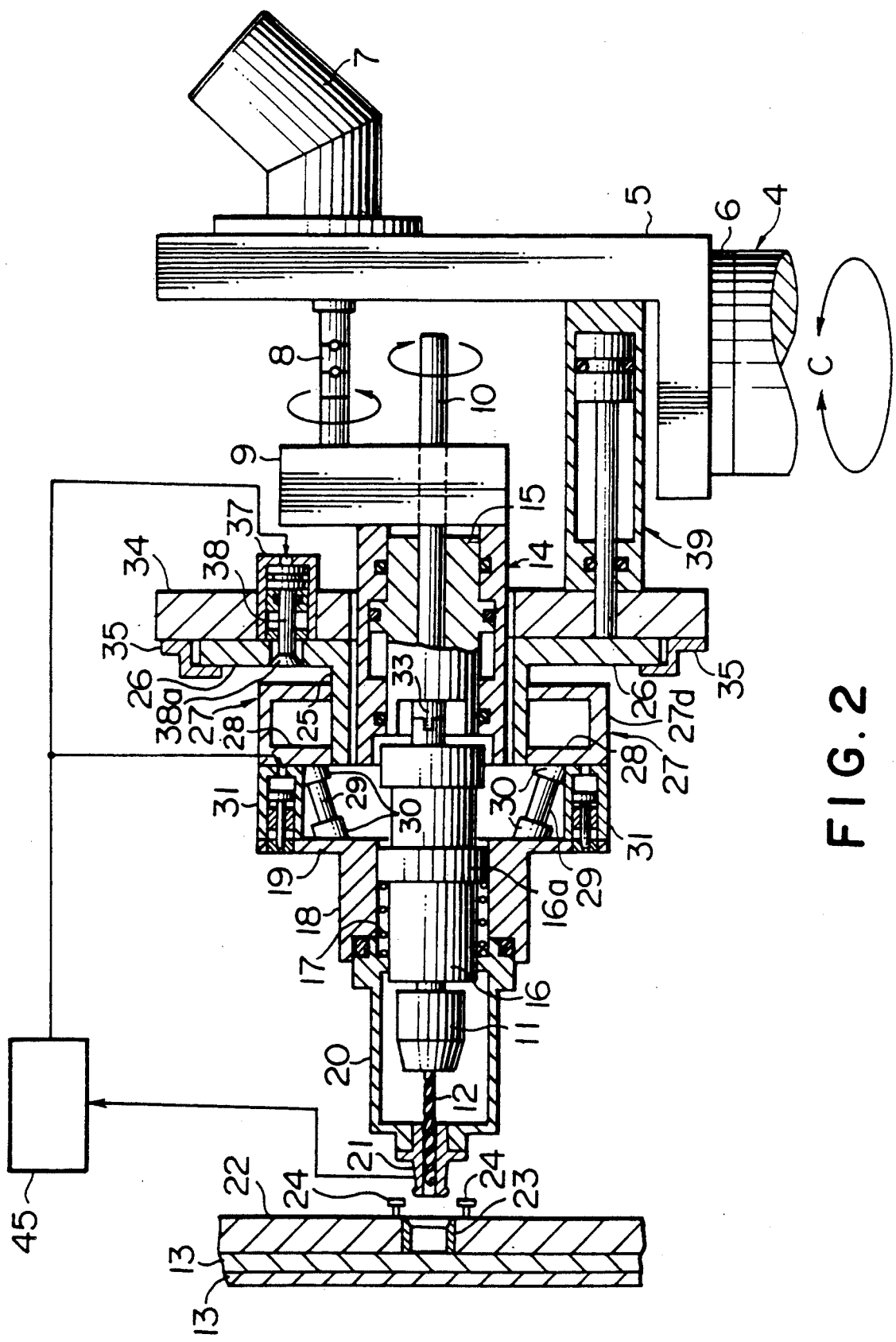
FIGS. 2 and 3 are longitudinal sectional views showing different operating conditions of the drilling unit of FIG. 1.
Figure 3:
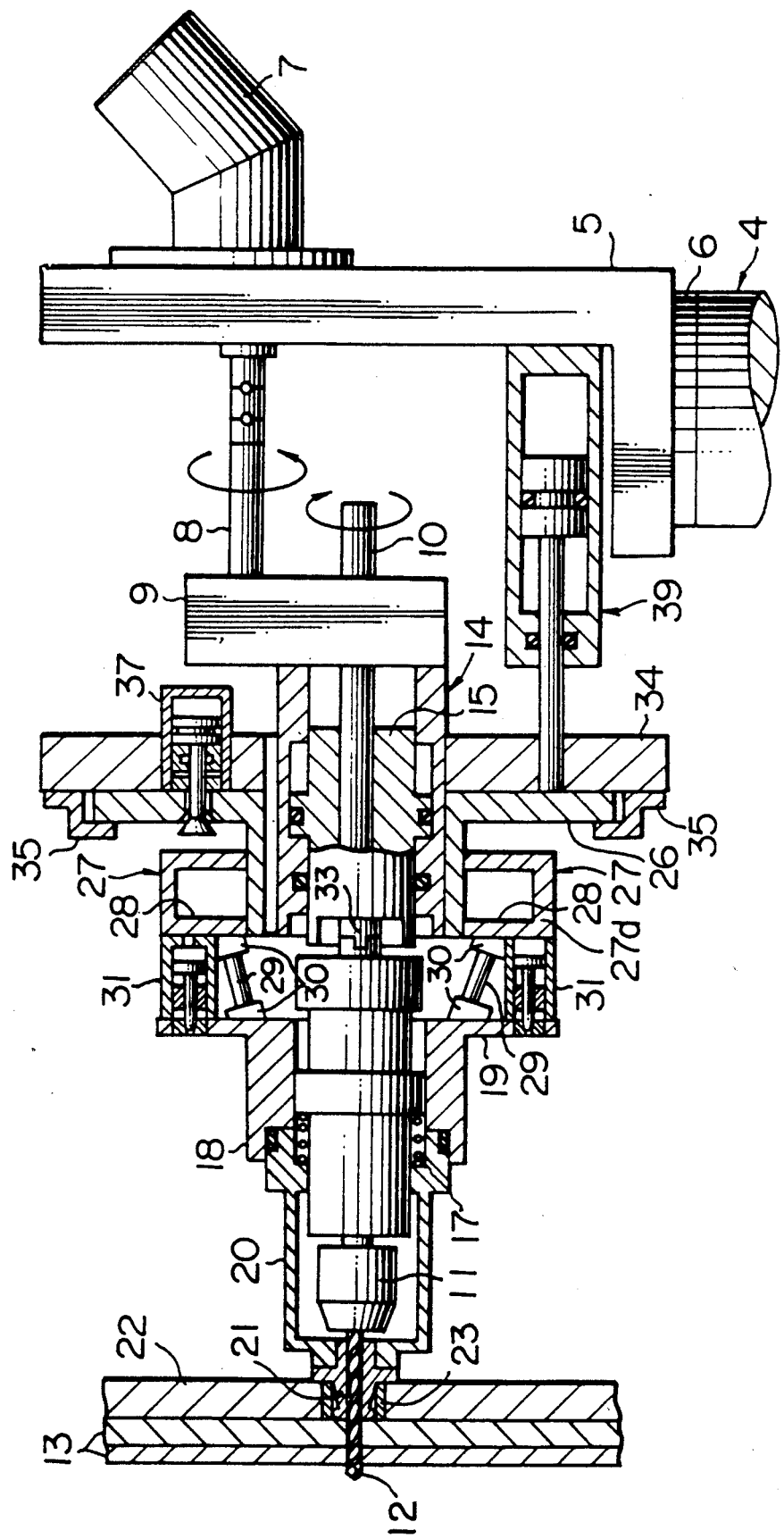

Details of the drilling unit 3 are shown in FIGS. 2 and 3.

Referring to FIG. 2, the adaptor 4 can swivel in the C-direction shown in response to an electric signal transmitted thereto through a cable, not shown. An L-shaped holder 5 is mounted on the adaptor 4 for swiveling through a bearing 6. An electric motor 7 is mounted on an upper portion of the rear or righthand (as viewed) surface of the holder 5. The motor 7 is provided with a spindle 8 extending leftwardly through the holder 5. A gear box 9 for speed reduction is provided at the front end of the spindle 8, and the rotation of the spindle 8, caused by the motor 7, is transmitted to a drill shaft 10 through the gear box 9.

A drill chuck 11 is mounted on the front or lefthand (as viewed) end of the drill shaft 10 and a drilling tool or drill 12 is held by the chuck 11.

The drill shaft 10 is mounted in, and fixedly passed through a central portion of a piston member 15 slidable in a cylinder of an actuator 14. The shaft 10 is fed towards a workpiece 13 by the operation of the actuator 14 as indicated in FIG. 3. A sleeve 16 is mounted around the drill shaft 10 in front of the actuator 14 to guide the drill shaft 10. The sleeve 16 is provided with a peripheral flange 16a. The sleeve 16 is accommodated in a first outer cylindrical member 18 so that the outer periphery of the flange 16a is snugly held by the inner surface of the first outer cylindrical member 18. The flange 16a is urged rearwardly or rightwardly (as viewed) by a coil spring 17 fitted around the sleeve 16.

The first outer cylindrical member 18 is provided, at its rear end, with an annular disc or flange 19 having a relatively large radius. A cylindrical nose piece 20 is attached to the front end of the cylindrical member 18. The nose piece 20 is firmly secured to the member 18 so as to accommodate the drill chuck 11 in the nose piece 20. A drill bush 21 is firmly secured to the front end of the nose piece 20. The drill bush 21 operates to guide the drill 12 to a predetermined position and is adapted to be inserted into a guide bush 23 in a drill guide plate or template 22 laid on the workpiece 13 for guiding the rotating drill. The drill bush 21 is adapted to be engaged with stationary fixing bolts 24 on the template 22 whereby an exact drilling position of the drill bush 21 is attained. The method for positioning the drill bush 21 will be described later.

The first outer cylindrical member 18 is operatively coupled to a second outer cylindrical member 25 disposed rearwards of the first cylindrical member 18 so as to be idly mounted around the outer peripheral surface of the actuator 14. The second outer cylindrical member 25 is provided, at its rear end, with an annular radial flange 26 acting as a sliding plate having a diameter larger than that of the flange 19 of the first cylindrical member 18.

Figure 4:
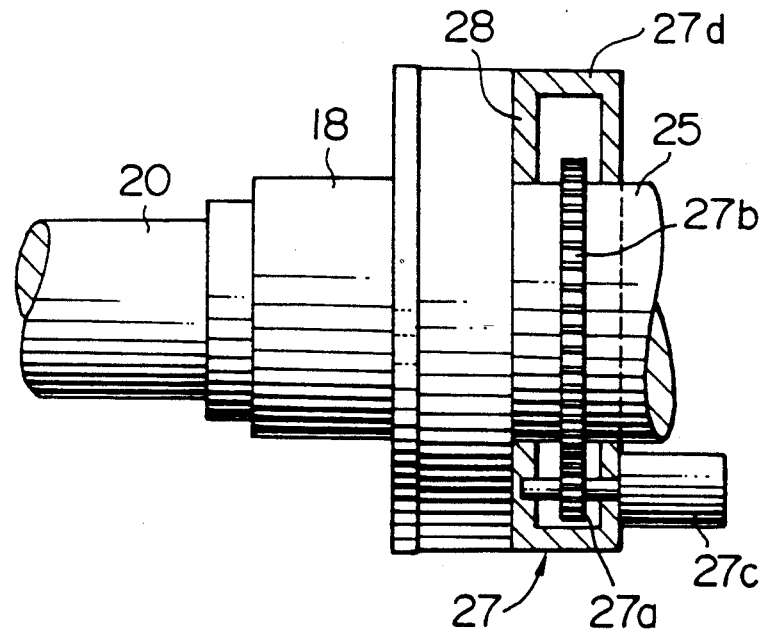
FIG. 4 is a view showing a nose piece rotating mechanism.

A mechanism 27 for rotating the annular nose piece 20 is provided around the outer periphery of the second outer cylindrical member 25 to be rotatable with respect to the member 25. As shown in FIG. 4, the nose piece rotating mechanism 27 comprises a pinion 27a and a gear 27b meshing with the pinion 27a and secured to the second cylindrical member 25. The pinion 27a is driven in two opposite directions by a D.C. motor 27c mounted on an annular casing 27d whereby the cylindrical member 25 is rotated by a predetermined angle about the actuator 14. A rotary hydraulic motor or cylinder assembly may be used instead of the driving mechanism described above. The rotation of the cylindrical member 25 causes rotation of the nose piece 20 through the first cylindrical member 18.

The casing 27d of the nose piece rotating mechanism 27 is provided with a side plate 28 constituting one side surface thereof. As shown in FIGS. 2 and 3, a plurality of cylindrical elastic support members 29 are arranged on the annular flange 19 of the first cylindrical member 18 in the circumferential direction thereof with equal angular distances therebetween. These elastic support members 29 are positioned between the flange 19 and the side plate 28 as clearly shown in FIG. 5. Each of the elastic support members 29 are secured at both ends thereof to the flange 19 and the side plate 28 through mounting members 30 each having a trapezoidal cross section. The inclinations of fixing surfaces 30a of the trapezoidal mounting members 30 are determined such that the elastic members 29 are included in oblique sides of a trapezoidal link mechanism 19, 29 (FIG. 6) with a front end 20a of the nose piece 20 being disposed at an imaginary intersection of the oblique sides of the trapezoidal link mechanism.

Each elastic support member 29 has a laminated structure comprising thin rubber discs and metal shim plates, so that the compression elastic coefficient and the shearing elastic coefficient in the axial direction of the elastic support member 29 can be made large. It is possible for the nose piece 20 to make a minute angular displacement with the front end 20a of the nose piece as the center of the angular displacement. The trapezoidal link mechanism 19, 29 constitutes a first remote compliance mechanism, which will be referred to as the first RCC mechanism hereinafter.

Figure 5:
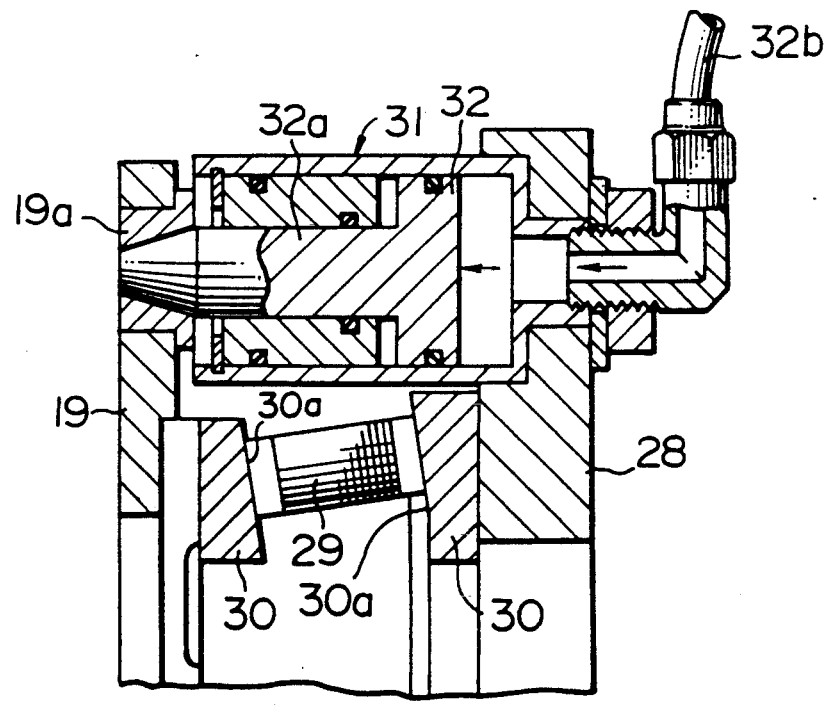
FIG. 5 is a sectional view of a first remote compliance mechanism and a first lock mechanism of the drilling unit shown in FIG. 2 or 3.
Figure 6:
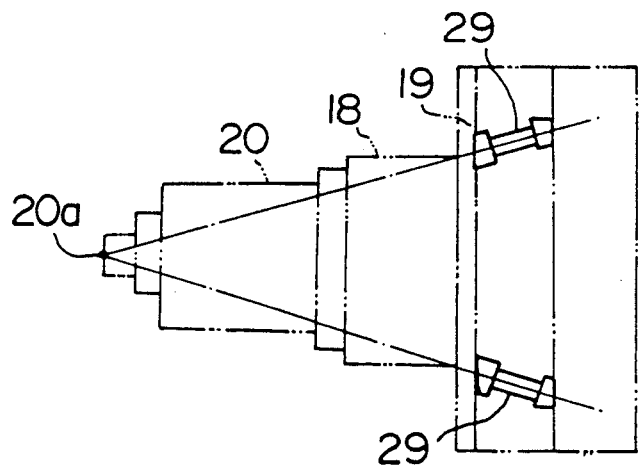
FIG. 6 is a diagrammatic view showing a trapezoidal link mechanism including elastic support members.

A first lock mechanism 31 for preventing the angular displacement of the first RCC mechanism is provided for the side plate 28 of the nose piece rotating mechanism 27. As indicated in FIG. 5, the first lock mechanism 31 is composed of a hydraulic cylinder assembly for linearly moving a locking pin 32a integral with a piston 32. The hydraulic cylinder assembly is actuated by a hydraulic fluid fed into a rear cylinder chamber of the assembly from a fluid source, not shown, through a hose 32b. When the hydraulic fluid is fed into the chamber of the hydraulic cylinder assembly, the piston 32 is acted upon and the locking pin 32a is moved forwardly or leftwardly as viewed in FIG. 5, and the front end of the locking pin 32a is fitted into a guide bush 19a secured in the annular flange 19, thereby to prevent angular displacement of the first outer cylinder member 18 and hence the nose piece 20.

Figure 7:
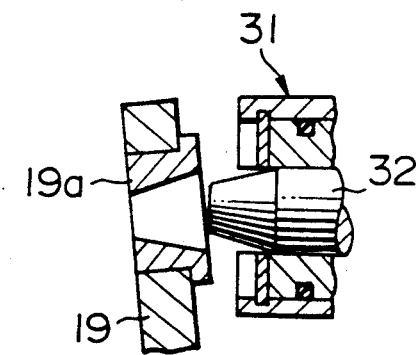
FIG. 7 is a fragmentary sectional view showing an unlocked condition of the first lock mechanism shown in FIG. 5.

FIG. 7 shows a condition in which the locking pin 32 is unlocked so that the annular flange portion 19 has been angularly displaced.

Figure 8:
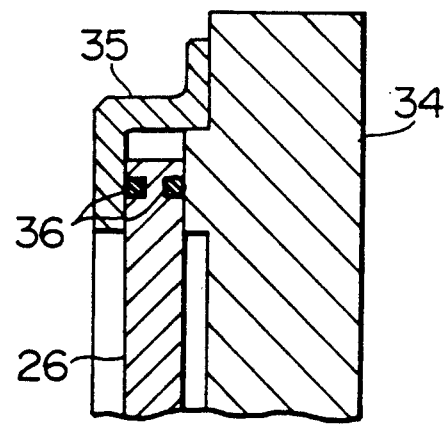
FIG. 8 is a partial sectional view of a second remote compliance mechanism of the drilling unit shown in FIG. 2 or 3.

As shown in FIGS. 2 and 3, the drill rotation shaft 10 is provided with a universal joint 33 between the sleeve 16 and the actuator 14 so as to follow the angular displacement of the first outer cylinder member 18. A guide plate 34 is idly mounted on the outer surface of the actuator 14 for guiding planar sliding motion of the annular flange. The guide plate 34 is composed of a disc plate having an outer diameter slightly larger than that of the annular flange 26. The guide plate 34 supports the annular flange 26 to be slidable in parallel with the plate 34 under the guidance of an annular stopper member 35 having a Z-shape in cross section as shown in FIG. 8. The stopper member 35 also acts to limit the amount of radial displacement of the flange 26. The annular flange 26 can smoothly move slidingly along the guide plate 34 while being assisted by steel balls 36 until the flange 26 abuts against the peripheral wall of the stopper member 35. It will be understood that the sliding motion of the flange 26 causes a transverse displacement of the drill bush 21 and the drill 12.

The mechanism 26, 34, 35 for carrying out the above described parallel motion constitutes a second remote compliance mechanism, which will be referred to as the second RCC mechanism hereinafter. A second lock mechanism 37 for preventing the planar displacement of the second RCC mechanism hereinafter. A second lock mechanism 37 for preventing the planar displacement of the second RCC mechanism is mounted in the guide plate 34. The second lock mechanism 37 is composed, similarly to the first lock mechanism 31, of a hydraulic cylinder assembly for linearly moving a locking pin 38. The hydraulic cylinder assembly is actuated by hydraulic fluid fed from a fluid source, not shown, through a hose. The locking pin 38 is arranged so as to extend through the annular flange 26. When the locking pin 38 is retracted, a countersunk head portion 38a of the locking pin 38 presses the flange 26 towards the guide plate 34 thereby to prevent the transverse sliding motion of the second outer cylindrical member 25.

An actuator 39 for advancing the nose piece 20 is provided in association with the guide plate 34. The front end of a ram of the actuator 39 is fixedly fitted into the guide plate 34 as shown in FIGS. 2 and 3. The actuator 39 is secured to the holder 5. When the arm 2 of the assembly robot 1 is swung and the front end of the nose piece 20 is then set to a predetermined drilling position, the actuator 39 is actuated so as to shift the ram forwardly or leftwardly as viewed in FIG. 3, thereby to insert the front end of the drill bush 21 into the guide bush 23 of the template 22.

FIGS. 9 to 12 show a mechanism for inserting the drill bush 21 into the guide bush 23 and for holding the drill bush 21.

Figure 9:
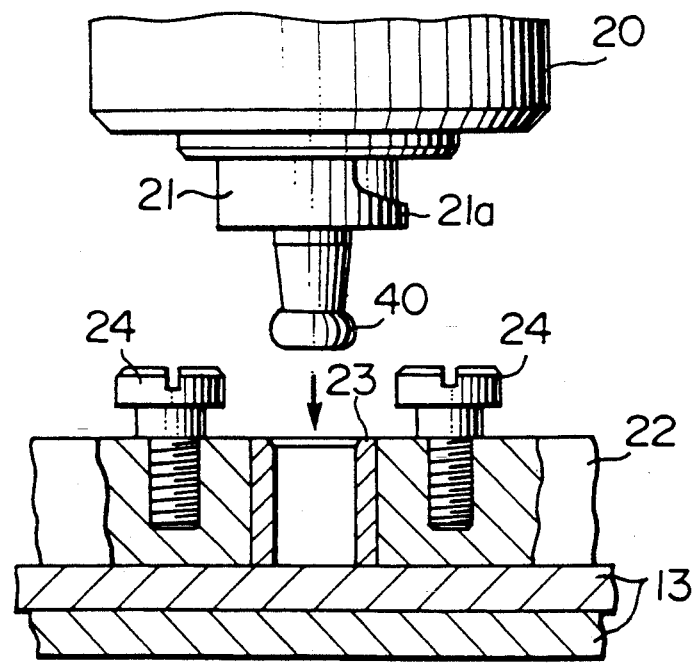
FIGS. 9 and 10 are partial sectional views of a drill bush of the drilling unit of FIG. 2 or 3, showing different states of the drill bush in connection with a workpiece to be drilled.
Figure 11:
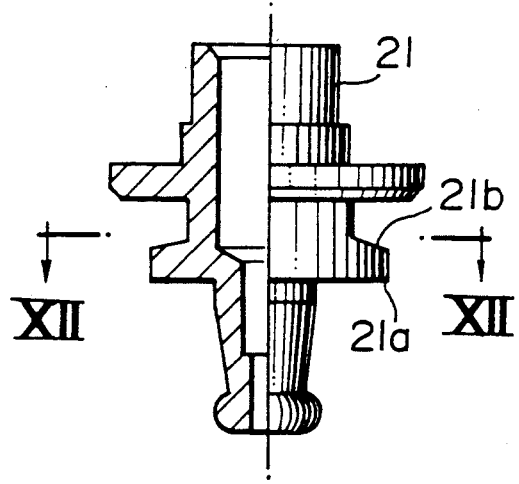
FIG. 11 is a front view, partially in section, of the drill bush shown in FIG. 2 or 3.
Figure 12A:
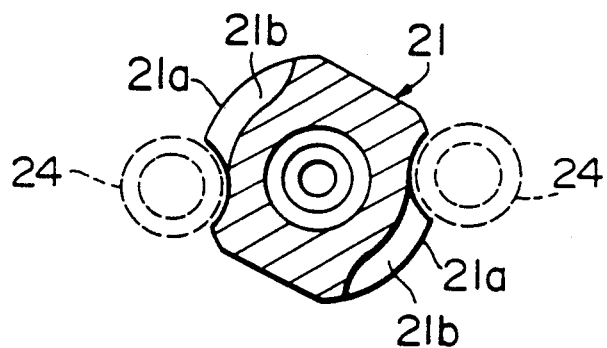
FIGS. 12A and 12B are sectional views taken along the line XII—XII of FIG. 11 and showing different states of the drill bush.

Referring to FIG. 9, the drill bush 21 is as shown in FIG. 11 and is secured to the front end portion of the nose piece 20 as shown in FIG. 9. The drill bush 21 is provided with a flange 21a having substantially a circular configuration. The flange 21a has an outer periphery partially cut out as shown in FIG. 12A. Side portions 21b of the cut out portions are chamfered so as to provide slightly inclined surfaces. A contact sensor 40 is mounted to the free end of the drill bush 21 for detecting a contact condition. The sensor 40 acts as a switching element for actuating the nose piece rotating mechanism 27.

Figure 10:
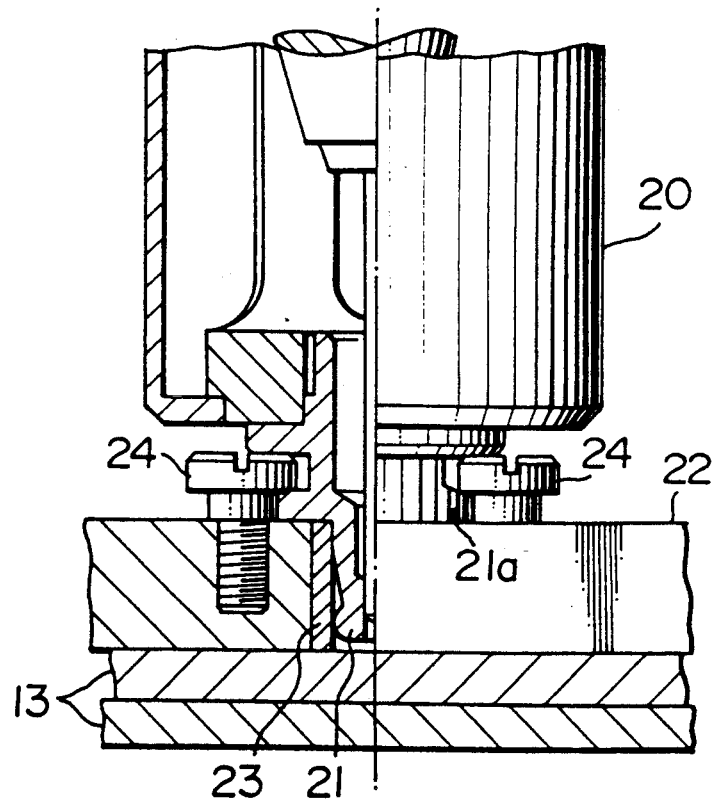
Figure 12B:
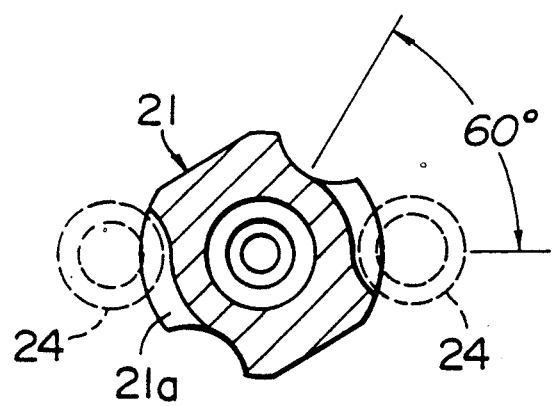

As shown in FIG. 9, the template 22 is laid on one surface of the workpiece 13, and the guide bush 23 is fixedly fitted into a bore formed in a portion corresponding to a portion to be drilled of the workpiece 13. The fixing bolts 24 are screwed to the template 22 adjacent to the guide bush 23. With such arrangement, the actuator 39 is operated to advance the nose piece 20 with the drill bush 21 being mounted. When the contact detecting sensor 40 contacts a portion of the chamfered surface of the guide bush 23, the locking conditions of the first and second lock mechanisms 31 and 37 are released. More specifically, a signal from the sensor 40 operates a control 45 (FIG. 2) to release the mechanism 31 and 37, and the first and second RCC mechanisms are actuated, thus enabling exact insertion of the drill bush 21 into the guide bush 23. When the drill bush 21 is inserted to a predetermined position in the guide bush 23, the nose piece 20 is rotated counterclockwisely by about 60° by the nose piece rotating mechanism 27 as shown in FIG. 12B. As a result, the flange 21a of the drill bush 21 is firmly engaged with the heads of the fixing bolts 24, thus achieving the firm engagement of the drill bush 21 with the guide bush 23 as shown in FIG. 10.

According to the structure or arrangement described above, the reaction force acting upon the drilling unit and the assembly robot during the drilling and/or countersinking operation is borne by the drill guide plate 22. Accordingly, dismounting of the robot arm from the template 22 is effectively prevented, and the retracting movement of the drilling unit due to the reaction force is also prevented, thus ensuring drilling accuracy and accuracy in countersinking depth.

Figure 13:
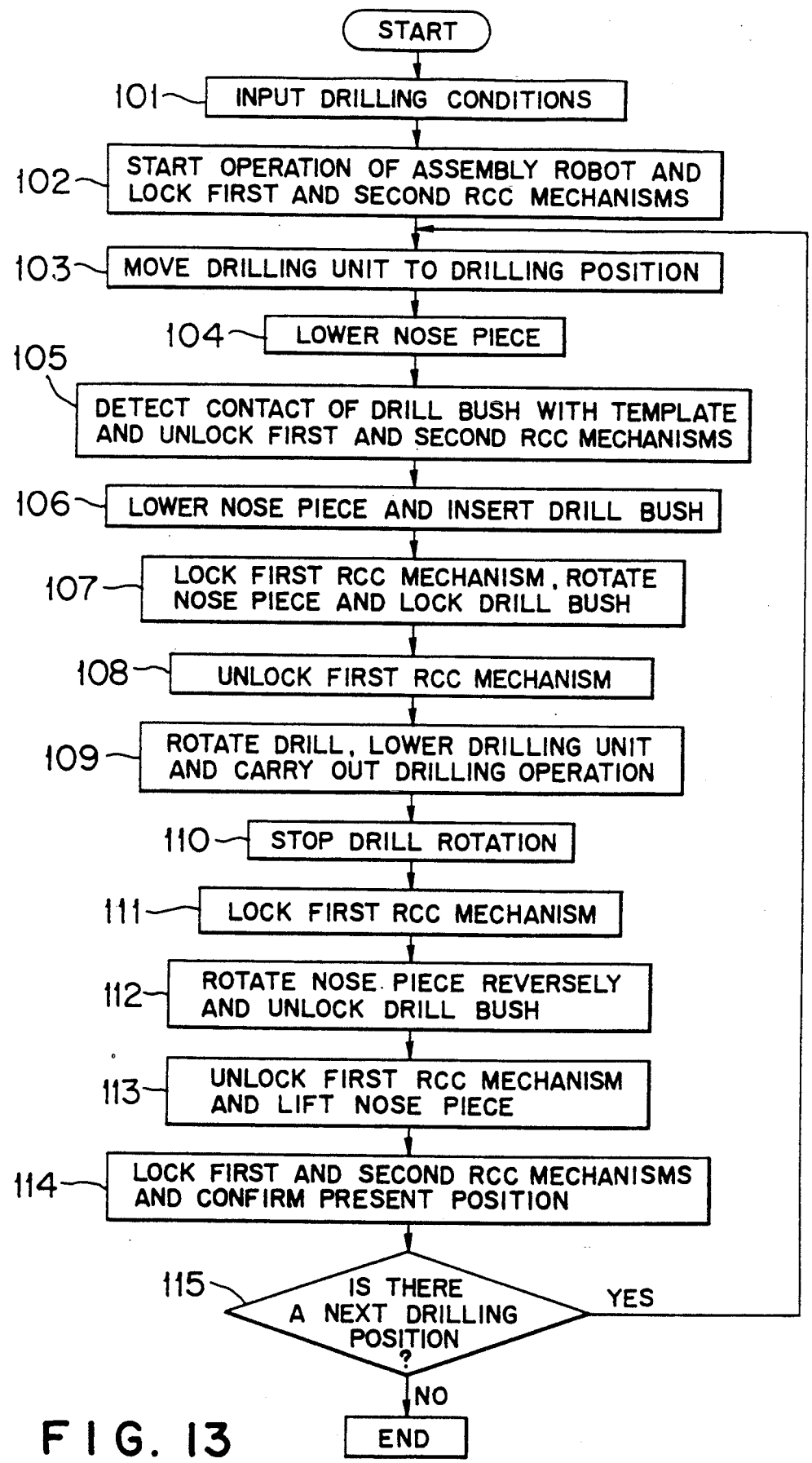
FIG. 13 is a flowchart showing drilling steps utilizing the drilling unit according to the present invention for carrying out a downward drilling operation.

A downward drilling operation, on the workpiece 13, of the drilling unit 3 of the assembly robot will be described below with reference to the flowchart of FIG. 13.

First, in a Step 101, the drilling conditions such as the position and the size of a bore to be drilled of the workpiece 13 are inputted into a control board mounted to the assembly robot. At this time, the drilling unit 3 mounted on the assembly robot 1 is at a preliminary set position. In the next Step 102, the first and second RCC mechanisms are locked by operating the first and second lock mechanisms 31 and 37, respectively, before the swinging movement of the art 2 of the assembly robot 1. The drilling unit 3 is then so swung that the front end of the drill bush 21 on the drilling unit 3 is moved to a position directly above the portion of the workpiece to be drilled and the swinging motion stops there (Step 103).

In the next Step 104, the nose piece 20 is lowered by actuation of the actuator 39, and in a Step 105, the first and second lock mechanisms 31 and 37 are released when the sensor 40 detects abutment of the front end of the drill bush 21 against the top portion of the guide bush 23 in the template 22. Thereafter, the nose piece 20 is further lowered and the drill bush 21 is inserted into the guide bush 23 under the operation of the first and second RCC mechanisms (Step 106).

Under these conditions, only the first RCC mechanism is locked by the first lock mechanism 31 and the nose piece 20 is rotated by a predetermined angle by means of the nose piece rotating mechanism 27 thereby to engage the flange 21a of the drill bush 21 with the engaging portions, that is, the bolts 24 in the embodiment shown, of the template 22, thus securely retaining the drill bush 21 to the drilling position (Step 107).

The first RCC mechanism is then unlocked by the first lock mechanism 31 (Step 108) and the drilling unit is lowered, while rotating the drill rotational shaft 10 by the operation of the driving motor 7, for the drilling and countersinking operations on the workpiece 13 (Step 109). Thereafter, the rotation of the drilling unit 3 is stopped (Step 110) and the first RCC mechanism is locked (step 111). The nose piece 20 is then rotated in a direction reverse to that in the Step 107 to release the locking condition of the drill bush 21 (Step 112). At the same time, the first lock mechanism 31 is released to move the nose piece 20 upwardly (Step 113). Thereafter, the first and second lock mechanisms 31 and 37 are again locked and these positional conditions are confirmed and inputted as a positional signal into the control board (Step 114).

In these operations, in case of a program control, the presence or absence of the position to be drilled in the next step is discriminated. In the case of presence of the drilling position, the step loops to the Step 103, whereas in the case of absence of the drilling position, the drilling operation is finished (Step 115).

The operations described above may be carried out by either manual control or automatic control based on a program control prepared by an offline storage.

While the presently preferred embodiment of the present invention have been shown and described, it is to be understood that this disclosure is for the purpose of illustration and that various changes and modifications may be made without departing from the scope of the invention as set forth in the appended claims.

What is claimed is:

1. A drilling unit of an assembly robot comprising a robot body and a robot arm swingably extending from the robot body, said drilling unit being mounted on one end of said robot arm and having a rotational shaft driven by a motor, a drill chuck mounted on one end of the rotational shaft, a drilling tool secured by the chuck to be inserted into a bore of a template applied to a workpiece, first actuator means for moving the drilling unit toward and away from the workpiece, and second actuator means for moving said rotational shaft toward and away from the workpiece, said drilling unit comprising:

a nose piece enclosing said drill chuck and having at a forward end thereof a drill bush in which said drilling tool is advanced and retracted;

a first cylindrical member carrying said nose piece on a forward end thereof;

a second cylindrical member supporting said first cylindrical member on a forward end thereof and having a radial flange on a rear end thereof;

an annular guide plate supporting said radial flange in face-to-face sliding contact;

said first and second cylindrical members and said guide plate being disposed around said rotational shaft in a substantially coaxial arrangement;

first remote compliance means comprising a plurality of elastic support members connecting said first and second cylindrical members to mount the first cylindrical member on the second cylindrical member, said elastic members constituting oblique links of a trapezoidal link mechanism having an imaginary intersection of the oblique links at a front end of said drill bush;

first lock means for preventing displacement of the first cylindrical member relative to the second cylindrical member;

second remote compliance means comprising said guide plate, said radial flange and stopper means for limiting sliding displacement of the radial flange relative to the guide plate;

second lock means for preventing displacement of the second cylindrical member relative to the guide plate; and means for securing said drill bush to said template.

2. The drilling unit according to claim 1, wherein said first cylindrical member is provided with a radial flange and said elastic support members are disposed between the radial flange and the second cylindrical member.

3. The drilling unit according to claim 2, wherein said second cylindrical member has therearound an annular housing secured thereto and having a side plate on which said elastic support members are fixed at rear ends thereof.

4. The drill unit according to claim 3, wherein said annular housing encloses a nose piece rotating mechanism for rotating the cylindrical members and hence the nose piece, said mechanism constituting a part of said means for securing the drill bush to the template.

5. The drilling unit according to claim 4, wherein said drill bush is provided with a flange which is engageable with engaging means provided on the template adjacent to the hole to be drilled, when the nose piece and the drill bush are rotated by the nose piece rotating mechanism.

6. The drilling unit according to claim 1, wherein said rotational shaft has a universal joint at an intermediate portion thereof.

7. The drilling unit according to claim 1, wherein each of said elastic support member has a laminated structure of rubber discs and metal shim layers 8. The drilling unit according to claim 3, wherein said first lock means comprises a piston-cylinder assembly operatively disposed between the radial flange of the first cylindrical member and the side plate of said annular housing, said piston-cylinder assembly having a locking pin engageable into said radial flange.

9. The drilling unit according to claim 1, wherein said stopper means of the second remote compliance means is mounted along a peripheral portion of the guide plate and has such a shape as to slidably embrace an outer peripheral edge of said radial flange of the second cylindrical member.

10. The drilling unit according to claim 1 wherein said second lock mechanism is a piston-cylinder assembly disposed in said guide plate and has a locking pin engageable with said radial flange of the second cylindrical member.

11. The drilling unit according to claim 1, wherein said first actuator means has one end connected to the arm of the robot body and another end operatively connected to the guide plate.

12. The drilling unit according to claim 1, wherein said second actuator means is disposed in a space surrounded by the second cylindrical member and the guide plate.

* * * * *